United States Patent [19]

Chen

[11] Patent Number: 5,628,157
[45] Date of Patent: May 13, 1997

[54] ELEVATED METAL FLOOR WITH WIRE DUCT

[76] Inventor: Yao-Tzung Chen, 7F, No. 214, Sec. 3, Ta-Tung Rd., Hsi-Chieh Chen, Taipei Hsien, Taiwan

[21] Appl. No.: 593,435

[22] Filed: Jan. 29, 1996

[51] Int. Cl.$^6$ .................................................. E04F 15/024
[52] U.S. Cl. ...................... 52/263; 52/220.2; 52/220.5; 52/220.6
[58] Field of Search ...................... 52/263, 220.2, 52/220.5, 220.6

[56] References Cited

U.S. PATENT DOCUMENTS

| | | | |
|---|---|---|---|
| 4,612,746 | 9/1986 | Higgins | 52/220.5 |
| 4,780,571 | 10/1988 | Huang | 52/263 X |
| 4,922,670 | 5/1990 | Naka et al. | 52/263 X |
| 5,049,700 | 9/1991 | Kobayashi et al. | 52/263 X |
| 5,341,614 | 8/1994 | Shimizu | 52/263 X |
| 5,400,554 | 3/1995 | Lu | 52/263 X |
| 5,459,968 | 10/1995 | Jin | 52/263 X |
| 5,477,649 | 12/1995 | Bessert | 52/263 |
| 5,483,776 | 1/1996 | Poppe | 52/263 X |

Primary Examiner—Wynn E. Wood
Attorney, Agent, or Firm—Bacon & Thomas

[57] ABSTRACT

An elevated metal floor with wire duct, including an elevated square metal floorboard formed with dent portion on upper surface along the periphery, a connecting seat, a connecting cap, a wire duct, multiple duct cover and multiple leg members. The connecting cap and the duct cover are snugly and flushly secured on the dent portion of the floorboard in a quick and easy manner. The floorboard can be easily taken away without using a sucker.

8 Claims, 6 Drawing Sheets

5,628,157

ELEVATED METAL FLOOR WITH WIRE DUCT

BACKGROUND OF THE INVENTION

The present invention relates to an elevated metal floor with wire duct, which provides regular layout for complicated wires and can be easily widely applied to different sites such as an office, meeting room, video/audio room, computer room, family, school, commercial store, etc.

An elevated floor is widely laid on the floor of an office or a family to avoid humidity on the floor. Also, the elevated floor permits the wires and pipelines to be installed thereunder.

The conventional elevated metal floor consists of elevated floorboards assembled together in a close pattern. In order to achieve a flush and close assembly of the elevated floorboards as shown in FIG. 1, complicated points and lines must be previously accurately marked on the floor. After the close assembly is completed, the floorboard can be hardly taken away and a special sucker with a handle is necessary for removing or adjusting the floorboard. In addition, this procedure must be performed by a specialist. Moreover, when laying the conventional elevated metal floor, complicated and intersected wires are randomly arranged under the elevated floor. Therefore, it will be quite difficult to maintain or change the wires after the elevated floor is constructed. Furthermore, the conventional elevated metal floor is time-consumingly constructed by great labor. Therefore, the cost for the conventional elevated metal floor is relatively high.

The wire exit seat of the conventional elevated metal floor is designed as an integral part of the floorboard. Therefore, it is necessary to additionally manufacture a mold for the wire exit seat. This increases the cost. Moreover, in the case that the air-conditioner system is installed under the elevated floor, a mold for the floorboard with the ventilating holes will be necessary. Also, the conventional floorboard with the wire exit seat cannot meet the requirement of more and more versatile layout of the wires of communication system, computer and general electric appliance.

In addition, the pavements paved over the conventional elevated floor are not specifically required in dimension so that it often takes place that the pavements cannot suitably paved over the floor. Also, the wires under the conventional elevated floor are often arranged without a regular path. This makes it difficult to check or service the wires later. Therefore, it is often necessary to remove a plurality of pavements and floorboards in order to find the wires for service. This is quite time-consuming and inconvenient.

SUMMARY OF THE INVENTION

It is therefore a primary object of the present invention to provide an elevated metal floor with wire duct, which can be easily constructed and provides regular layout for complicated wires, permitting the wires to be easily checked and maintained later. The floorboard can be easily taken away or adjusted without using a sucker. The wire exit seat and ventilating checker seat are separate parts so as to simplify the manufacturing of the mold for the floorboard.

It is a further object of the present invention to provide the above elevated metal floor in which the floorboards and the wire ducts are such assembled that a certain specification of pavement can be tidily paved over the floorboard in order.

It is still a further object of the present invention to provide the above elevated metal floor which can be more widely applied to different sites such as an OA office and computer room and in which the floorboards can be easily removed or adjusted, permitting the wires thereunder to be conveniently maintained or changed at low cost.

The present invention can be best understood through the following description and accompanying drawing, wherein:

DETAILED DESCRIPTION OF THE PREFERRED EMBODIMENTS

Figure 1:
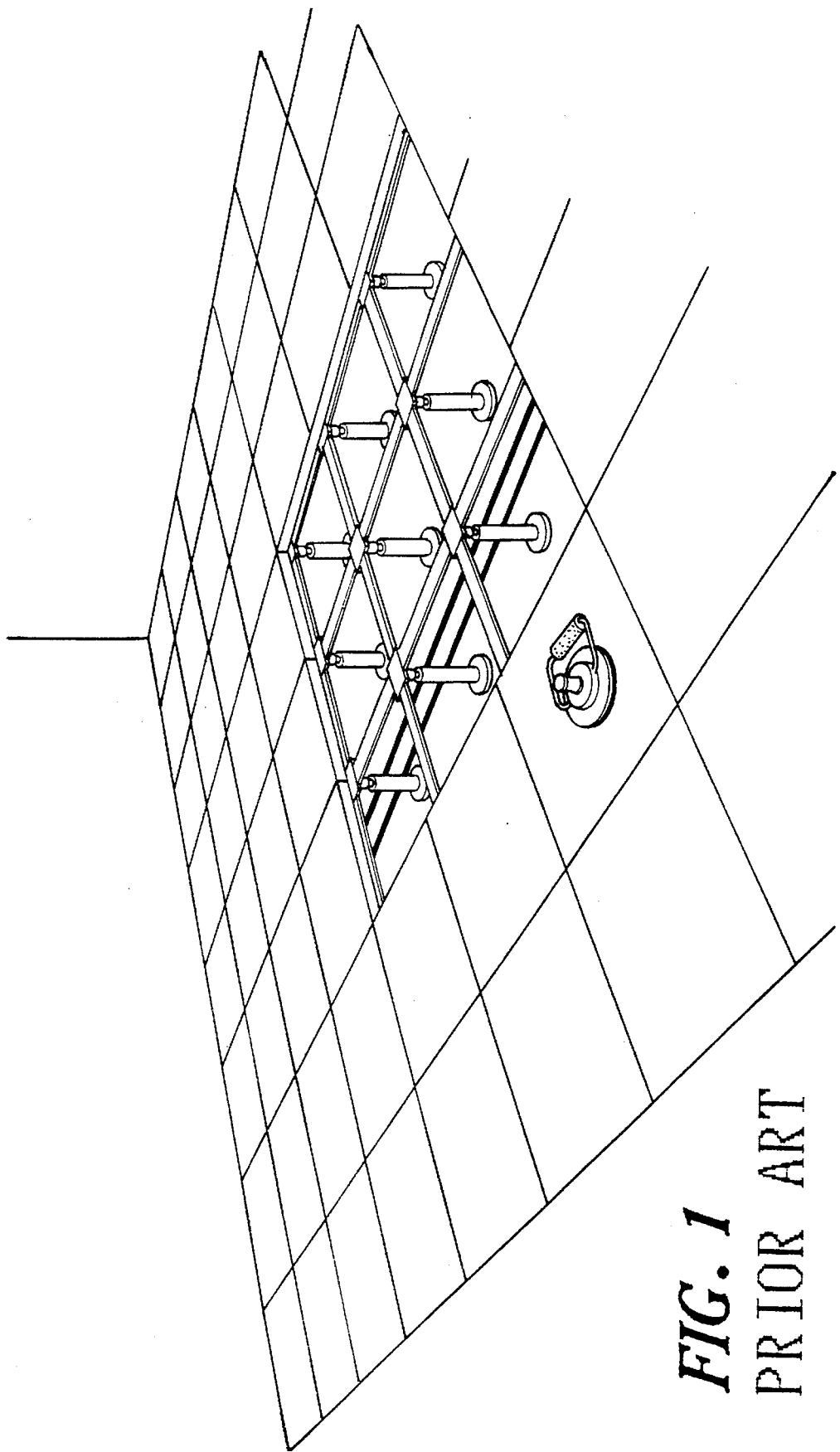
FIG. 1 is a perspective view of the conventional elevated metal floor.
Figure 2A:
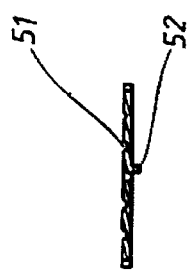
FIG. 2A is a cross-sectional view taken along the line 20—20 of FIG. 2.
Figure 2:
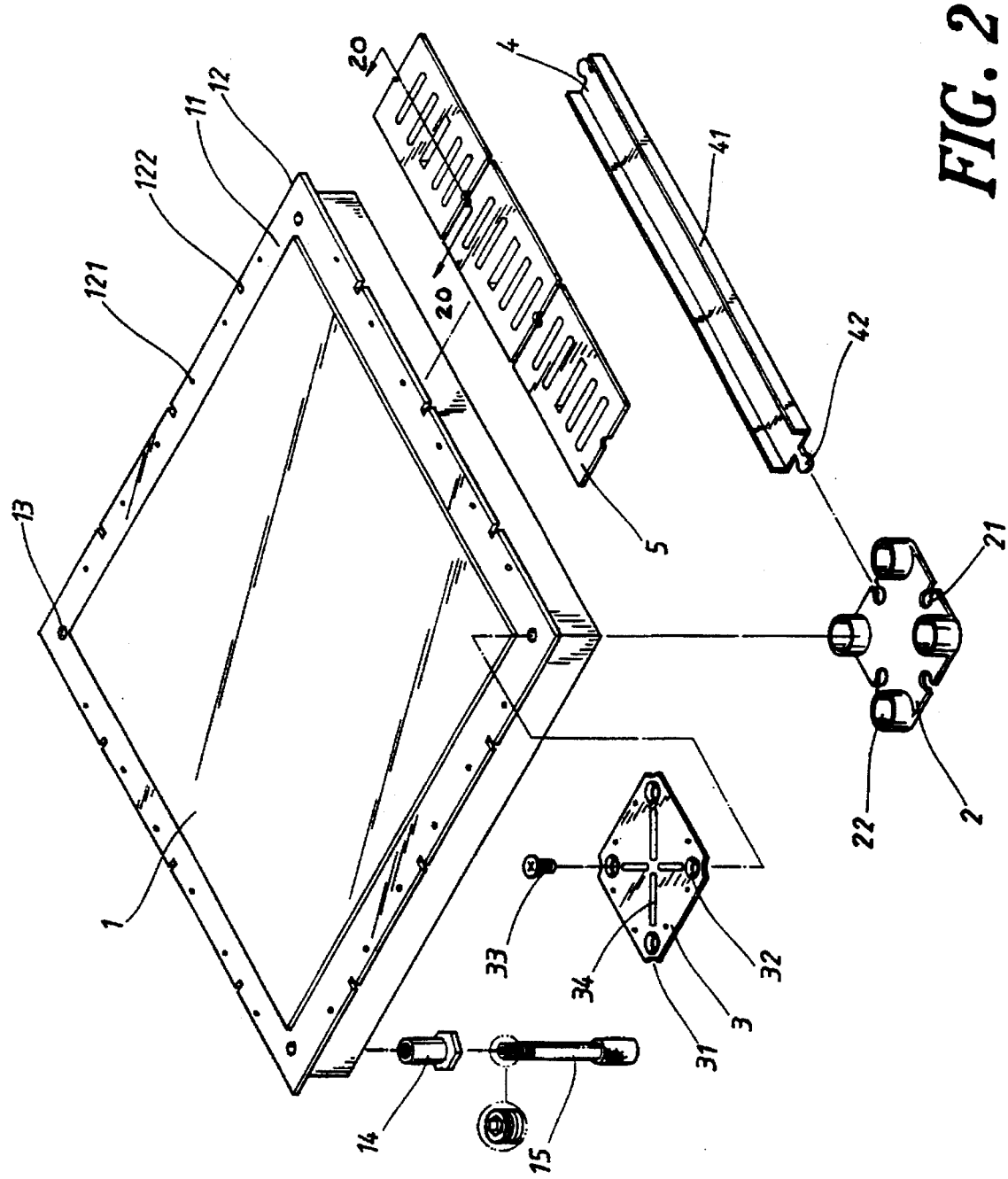
FIG. 2 is a perspective exploded view of the present invention.
Figure 3:
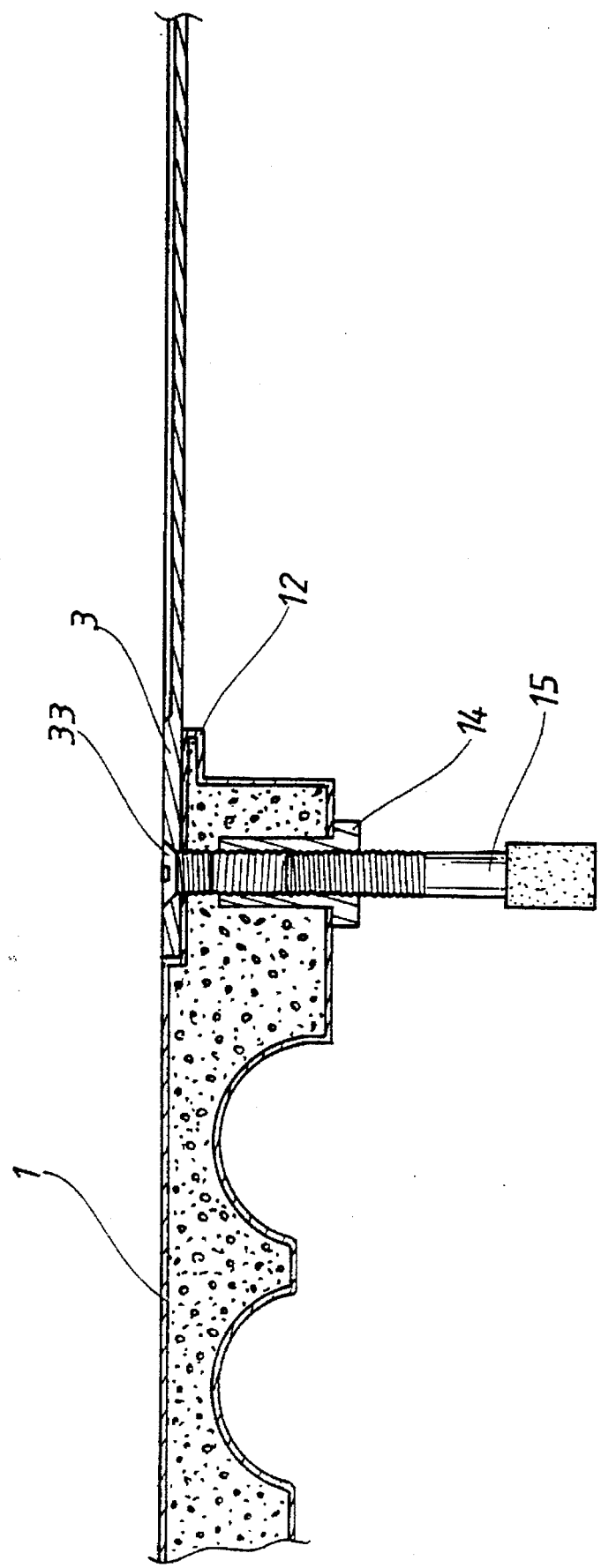
FIG. 3 is a side sectional view of the present invention.
Figure 4:
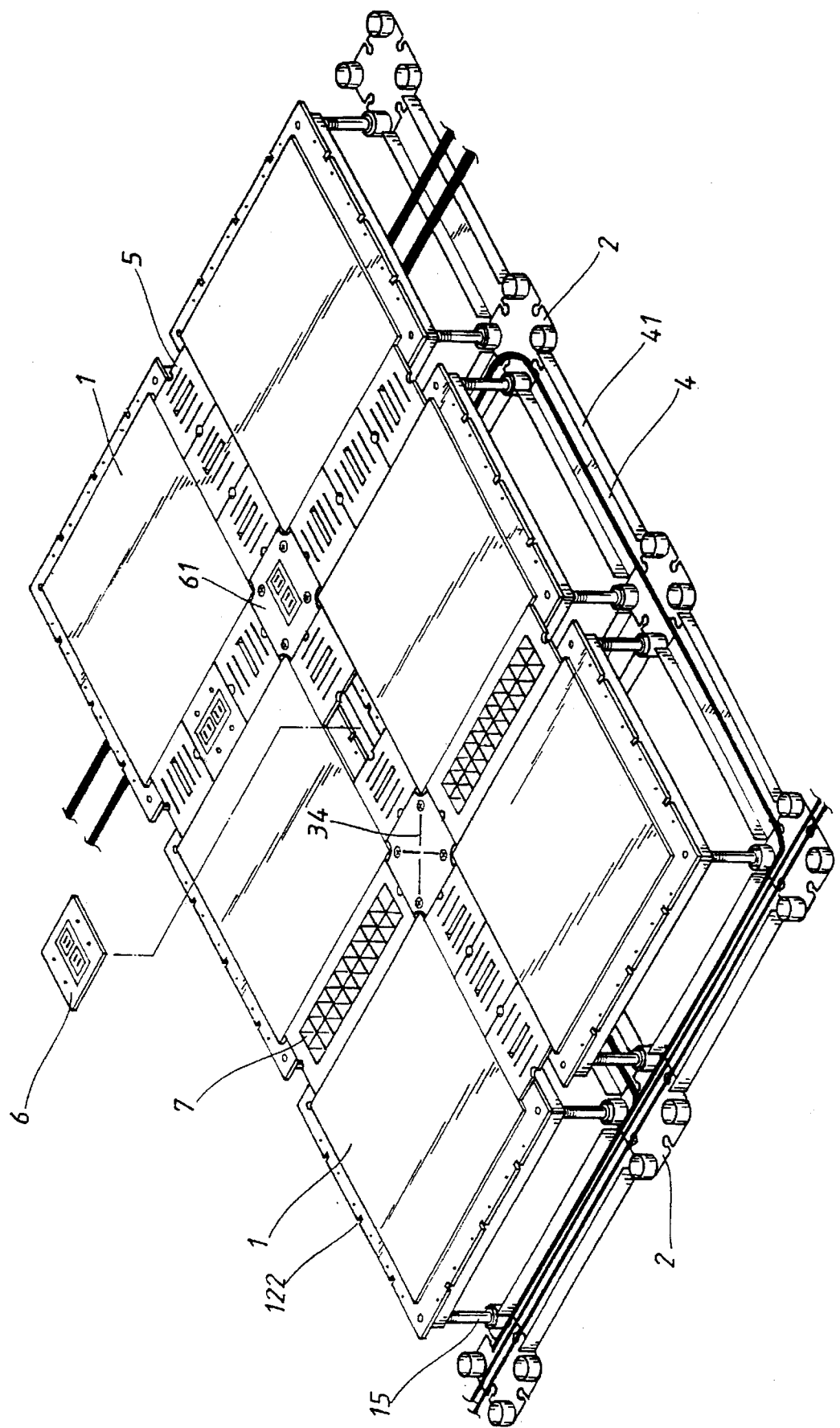
FIG. 4 is a perspective view of the assembly of the elevated metal floorboards and other parts of the present invention, in which the wires are passed through the wire ducts in a regular pattern.
Figure 5:
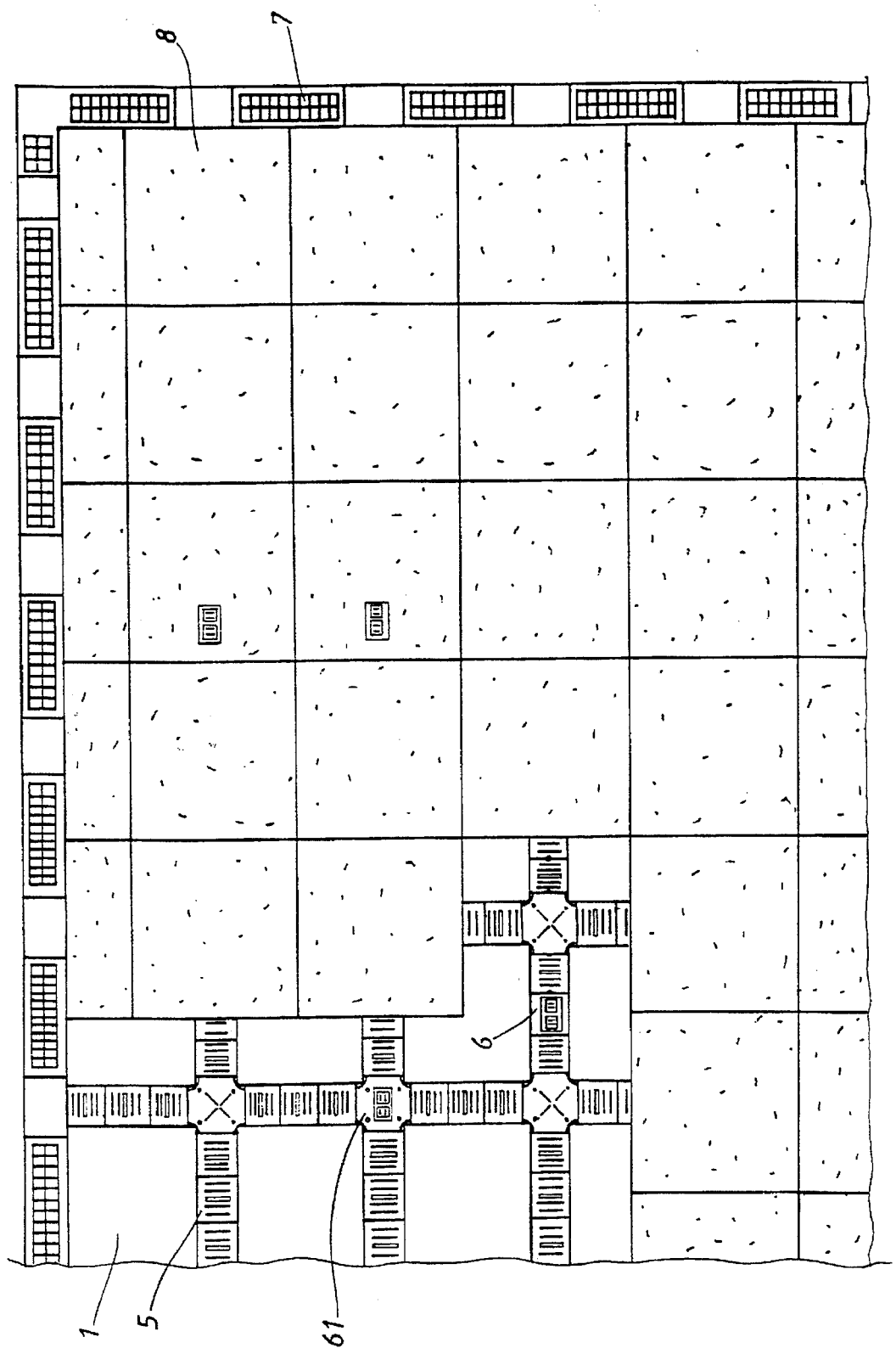
FIG. 5 is a plan view of the present invention in which tile carpets or pavements are paved over the floorboards.
Figure 6:
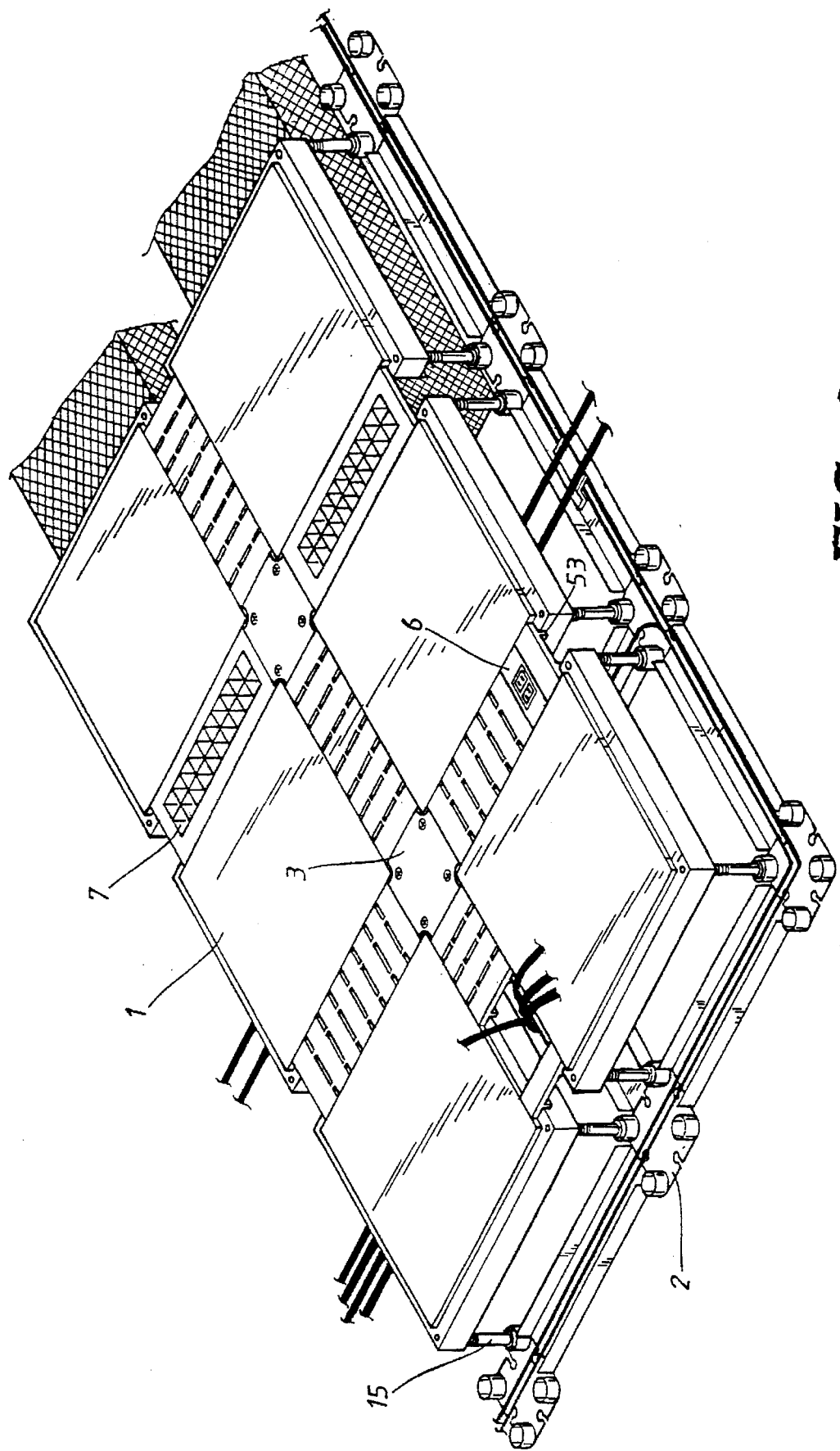
FIG. 6 is a perspective view of another embodiment of the present invention.

Please refer to FIGS. 2 to 4. The present invention includes an elevated square metal floorboard 1, a connecting seat 2, a connecting cap 3, a wire duct 4, a multiple duct cover 5 and multiple leg members 15. The metal floorboard 1 is formed with a dent portion 11 on upper surface along the periphery for placing the duct cover 5 and the connecting cap 3 thereon. The dent portion 11 has an outward extending thin flange 12 formed with equally spaced orifices 121 and notches 122 on each side. In addition, four openings 13 are formed respectively on four corners of the floorboard and a threaded tube 14 is upwardly inserted into each opening 13. A leg member 15 having a threaded top section is screwed upwardly into each thread tube 14. The top section of the leg member 15 is formed with a hexagonal hole, whereby a wrench can be passed through the opening 13 into the hexagonal hole for adjustment of the height of the floorboard 1. The leg member 15 optionally has a height of 5 cm, 10 cm and 15 to 30 cm for different sites. The connecting seat 2 is a square member having four keyhole-shaped openings or mortises 21 on four sides and four sleeve bodies 22 on four corners for inserting the leg members 15 thereinto. When the floorboards 1 are elevatedly located on the connecting seats 2, cross-shaped clearances are defined between the floorboards 1 for arranging wires or ventilating tubes therein. On the dent portions 11 of the floorboards 1 are disposed the connecting caps 3, duct covers 5, first wire exit seats 6, second wire exit seats 61 and ventilating checker seats 7. The connecting cap 3 is a square plate member formed with four arch cuts 31 on four corners and four openings 32 on inner sides of the cuts 31, whereby a screw 33 is passed through the opening 13 of the floorboard 1 and the opening 32 of the connecting cap 3 to secure the connecting cap 3 on the corner of the floorboard 1. In addition, the connecting cap 3 is formed with four radial reinforcing grooves 34 extending from the center to the four corners for preventing the connecting cap 3 from being deformed. The second wire exit seat 61 has the same dimension as the connecting cap 3. The wire duct 4 is a rectangular member having two lateral walls 41 defining a channel for the wires to pass therethrough as shown in FIGS. 4 and 6. The wire duct 4 has two keyhole-shaped tenons 42 at two ends for engaging with the corresponding shaped mortises 21 of the connecting seat 2. Accordingly, the connecting seats 2 and the wire ducts 4 can be accurately assembled to previously form the layout on the working site. After the layout is completed, the underfloor wires are laid on. Thereafter, the leg members 15 secured to the floorboards 1 are one by one inserted into the sleeve bodies 22 of the connecting seats 2. Then the connecting caps 3 and the duct covers 5 are disposed on the dent portions 11 of the floorboards 1 and the first or second wire exit seat 6 or 61 is located at predetermined position. Finally, multiple square tile carpets 8 are laid over the floorboards 1 as shown in FIG. 5. The wire duct 5 is a rectangular member formed with multiple reinforcing grooves 51 and a flange 52 for engaging with the notch 122 of the thin flange 12 of the floorboard 1 so as to avoid slipping. Multiple duct covers 5 are assembled together to have a length equal to that of the wire duct 4. The first wire exit seat 6 has the same dimension as the duct cover 5 and the ventilating checker seat 7 has the same dimension as the wire duct 4. One duct cover 5 or one connecting cap 3 can be replaced by a modulized first wire exit seat 6 or second wire exit seat 61 without replacing the entire assembly of the elevated floorboards 1. The duct cover 5 of the present invention has a light weight and can be easily taken out for easily taking away the floorboard 1. Moreover, as shown in FIG. 6, with respect to relatively large diameter wires, one or several duct covers 5 can be removed to conduct the wires outward to the surface of the floorboard 1 without drilling a hole thereon.

FIG. 6 shows another embodiment of the present invention, wherein the floorboard 1 is free from the thin flange 12 and is only formed with four openings 13 on four corners. Also, the duct cover 5 is composed of multiple small plates and has a length equal to that of the wire duct 4. Each small plate is formed with two ribs 53 thereunder, which is spaced by a distance identical to the width of the wire duct 4. The distance between the rib 53 and the lateral edge of the small plate is identical to the width of the dent portion 11 of the floorboard 1, whereby the duct cover 5 is snugly disposed on the dent portion 11 without displacement. When it is necessary to conduct the wires outward, one or more small plates can be removed.

In conclusion, the elevated floorboards 1 of the present invention provide regular layout for complicated wires and can be easily laid on the floor of the working site. In addition, the wires can be conveniently maintained later at low cost.

It is to be understood that the above description and drawings are only used for illustrating some embodiments of the present invention, not intended to limit the scope thereof. Any variation and derivation from the above description and drawings should be included in the scope of the present invention.

What is claimed is:

1. An elevated metal floor with wire duct, comprising an elevated square metal floorboard, a connecting seat, a connecting cap, a wire duct, a multiple duct cover and multiple leg members, the metal floorboard being formed with a dent portion on an upper surface along a periphery thereof, the dent portion including four corners and an opening formed at each corner, a threaded tube being upwardly inserted into each opening, a leg member being upwardly screwed into each threaded tube.

2. A metal floor as claimed in claim 1, wherein the dent portion has an outwardly extending thin flange formed with a plurality of equally spaced orifices and notches on each side.

3. A metal floor as claimed in claim 1, wherein the connecting cap is secured on the corners of the dent portion of the floorboard by screws extending downwardly into the openings thereof.

4. A metal floor as claimed in claim 2, wherein the connecting cap is secured on the corners of the dent portion of the floorboard by screws extending downwardly into the openings thereof.

5. A metal floor as claimed in claim 1, wherein the connecting seat is a square member having four keyhole-shaped mortises on four sides and four sleeve bodies on four corners for inserting the leg members thereinto, whereby when the floorboards are elevatedly located on the connecting seats, cross-shaped clearances are defined between the floorboards for receiving the connecting caps, the duct covers, wire exit seats and ventilating seats therein, the connecting cap including a square plate member formed with four arch cuts on four corners thereof and four openings on inner sides of the cuts, and the connecting cap being formed with four radial reinforcing grooves extending from the center to the four corners.

6. A metal floor as claimed in claim 1, wherein the wire duct is a rectangular member having two lateral walls defining a channel, the wire duct having two keyhole-shaped tenons at two ends for engaging with the keyhole-shaped mortises of the connecting seat, the wire duct being a rectangular member formed with multiple reinforcing grooves and a flange, and multiple duct covers being assembled together in a length equal to that of the wire duct.

7. A metal floor as claimed in claim 6, wherein the duct cover is a rectangular member having a length equal to that of the wire duct and two ribs formed under a lower side of the duct cover, the ribs being spaced by a distance identical to the width of the wire duct, and the distance between each rib and the lateral edge of the duct cover being identical to the width of the dent portion of the floorboard.

8. A metal floor as claimed in claim 1, further including a ventilating seat located on the dent portion of the floorboard, the ventilating seat being formed with ventilating holes and has a length equal to that of the wire duct.

* * * * *